United States Patent
Osborne et al.

(10) Patent No.: US 10,527,344 B2
(45) Date of Patent: Jan. 7, 2020

(54) APPLIANCE USER INTERFACE AND DISPLAY

(71) Applicant: Haier US Appliance Solutions, Inc., Wilmington, DE (US)

(72) Inventors: Christopher Hayward Osborne, Louisville, KY (US); Timothy Ray Jackson, Louisville, KY (US); Corey Phillip Polhamus, Coxs Creek, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 37 days.

(21) Appl. No.: 15/935,098

(22) Filed: Mar. 26, 2018

(65) Prior Publication Data
US 2019/0293343 A1    Sep. 26, 2019

(51) Int. Cl.
*G01V 8/12*        (2006.01)
*F25D 29/00*     (2006.01)

(52) U.S. Cl.
CPC .............. *F25D 29/00* (2013.01); *G01V 8/12* (2013.01); *F25D 2400/361* (2013.01)

(58) Field of Classification Search
CPC ........ G02B 1/115; G02B 5/281; G02B 5/207; G01V 8/10; G01V 3/26; G01V 8/12; F25D 2400/361; F25D 29/00
See application file for complete search history.

(56) References Cited

U.S. PATENT DOCUMENTS

| | | | |
|---|---|---|---|
| 8,567,955 B2 | 10/2013 | Amm et al. | |
| 8,915,596 B2 | 12/2014 | Amm et al. | |
| 9,658,706 B2 | 5/2017 | Ahn | |
| 9,768,746 B2 | 9/2017 | Zalisk et al. | |
| 2011/0181516 A1 | 7/2011 | Mallory et al. | |
| 2012/0170284 A1 | 7/2012 | Shedletsky | |
| 2014/0055856 A1 | 2/2014 | Amm et al. | |
| 2014/0132569 A1* | 5/2014 | Lien ........................ | G06F 3/041 345/175 |
| 2017/0184764 A1 | 6/2017 | Matsuyuki et al. | |

* cited by examiner

*Primary Examiner* — David P Porta
*Assistant Examiner* — Fani Boosalis
(74) *Attorney, Agent, or Firm* — Dority & Manning, P.A.

(57) ABSTRACT

An appliance user interface and display is provided herein. The appliance user interface may include a substrate panel, an electromagnetic sensor, and an applied layer. The electromagnetic sensor may be positioned behind the substrate panel along the axial direction. The applied layer may be attached to the substrate panel. The applied layer may include a perforated region axially aligned with the electromagnetic sensor. The perforated region may have a deposited portion and a negative portion. The deposited portion may include a material restricting infrared light along the axial direction. The negative portion may define a transparent void through the material and permit infrared light along the axial direction.

20 Claims, 7 Drawing Sheets

APPLIANCE USER INTERFACE AND DISPLAY

FIELD OF THE INVENTION

The present subject matter relates generally to user interfaces and displays for consumer appliances, such as a refrigerator appliance.

BACKGROUND OF THE INVENTION

Consumer appliances, such as refrigerator appliances, oven appliances, microwave appliances, dishwasher appliances, etc., often utilize one or more lights are often provided with a control panel or control panel as part of a display. By illuminating, the lights may generally communicate relevant information regarding the appliance. Such lights may be useful in providing information, but can be unsightly or undesirable, especially when the lights are not illuminated. For instance, the lights may extend forward from the rest of the user interface, interrupting an otherwise smooth surface. Even if the lights do not extend forward from the rest of the display, a user may be able to see where the light is positioned, even when the light is not illuminated. Such visual disruptions may cheapen the appearance and perceived quality of the appliance. Moreover, the visibility of the light when unilluminated may be distracting and hinder the efficacy of light. For instance, a user may take less notice of the light when illuminated because the light is visible even when unilluminated. Furthermore, the visibility of the unilluminated light may cause confusion for a user, who might believe that the light is intended to be a button that can be depressed (e.g., in order to control the appliance).

Separate or together with the above-described lights, many consumer appliances are designed to include one or more sensors mounted on or near a display to communicate with users, other appliances, or the surrounding environment. For each sensor, a hole may be provided through the display to permit the passage of signals, such as light. However, this can cause a number of problems. For instance, the hole creates a visual disruption in the user interface. Furthermore, the visibility of the hole may cause confusion for a user, who might believe that a light or button should be present at the location of the hole.

As a result, further improvements for appliance user interfaces may be desirable. In particular, it would be advantageous to provide a user interface to address one or more of the above-described issues.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an appliance user interface is provided. The appliance user interface may include a substrate panel, an electromagnetic sensor, and an applied layer. The electromagnetic sensor may be positioned behind the substrate panel along an axial direction. The applied layer may be attached to the substrate panel. The applied layer may include a perforated region axially aligned with the electromagnetic sensor. The perforated region may have a deposited portion and a negative portion. The deposited portion may include a material restricting infrared light along the axial direction. The negative portion may define a transparent void through the material and permit infrared light along the axial direction.

In another exemplary aspect of the present disclosure, an appliance user interface is provided. The appliance user interface may include a substrate panel, an electromagnetic sensor, an applied layer, and an opaque secondary layer. The electromagnetic sensor may be positioned behind the substrate panel along an axial direction. The applied layer may be attached to the substrate panel between the electromagnetic sensor and the substrate panel along the axial direction. The applied layer may include a perforated region axially aligned with the electromagnetic sensor. The perforated region may have a deposited portion and a negative portion. The deposited portion may include a material restricting infrared light along the axial direction. The negative portion may define a transparent void through the material and permit infrared light along the axial direction. The opaque secondary layer may be attached to the applied layer between the electromagnetic sensor and the applied layer along the axial direction. The opaque secondary layer may define a transparent aperture axially aligned with the perforated region.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Figure 1:
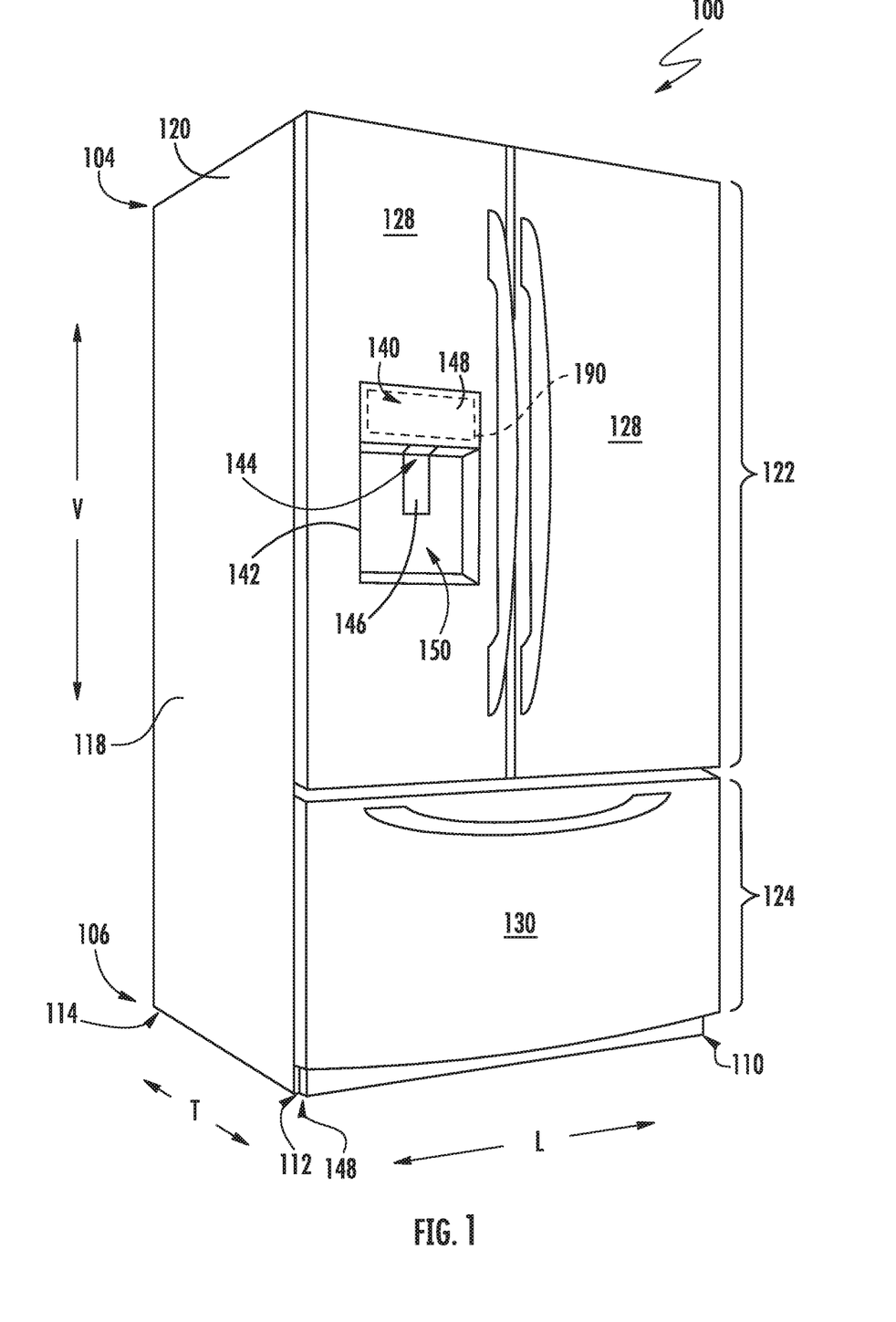
FIG. 1 provides a perspective view of a refrigerator appliance according to exemplary embodiments of the present disclosure.
Figure 2:
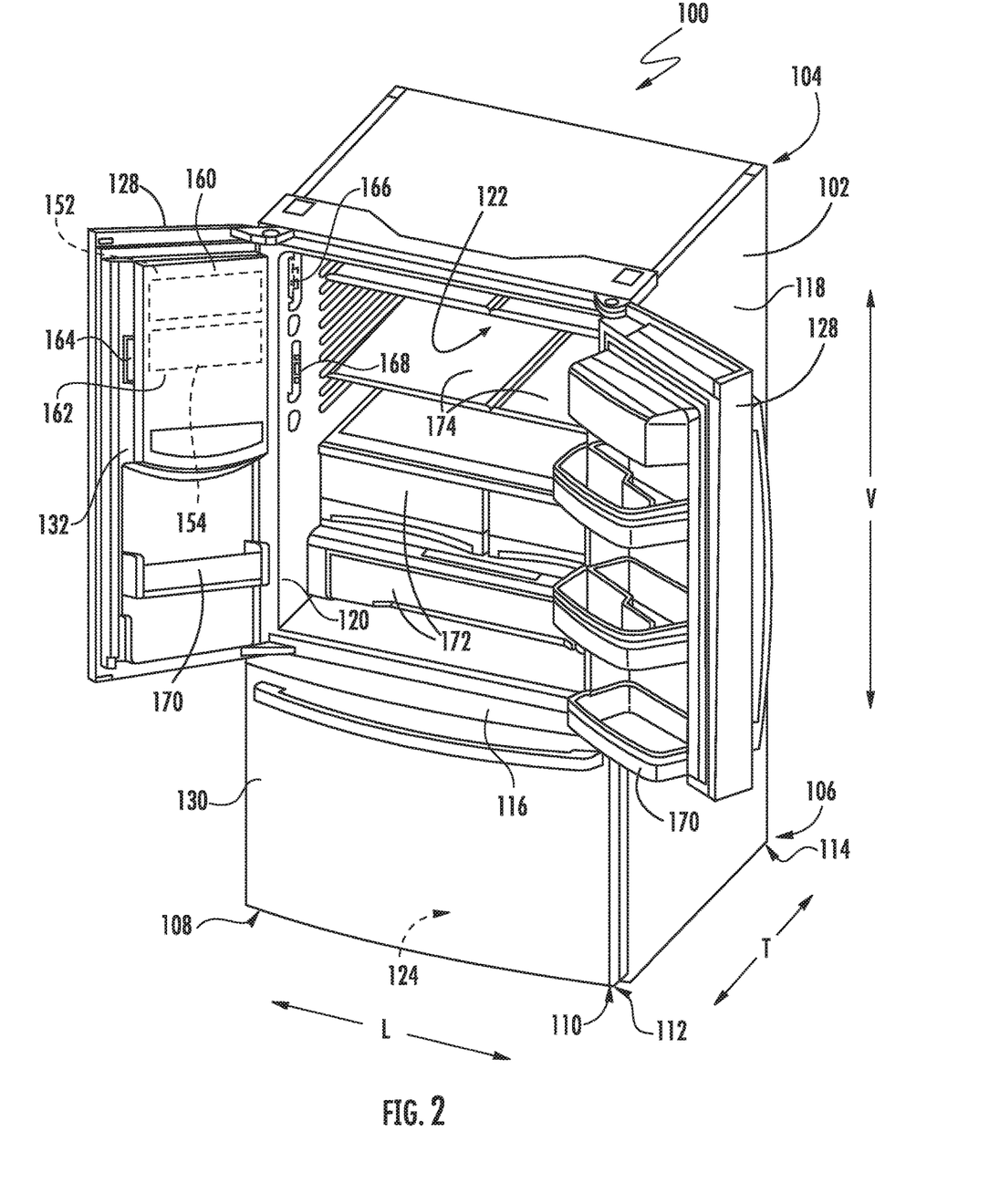
FIG. 2 provides a perspective view of the example refrigerator appliance shown in FIG. 1, wherein a refrigerator door is in an open position according to exemplary embodiments of the present disclosure.
Figure 3:
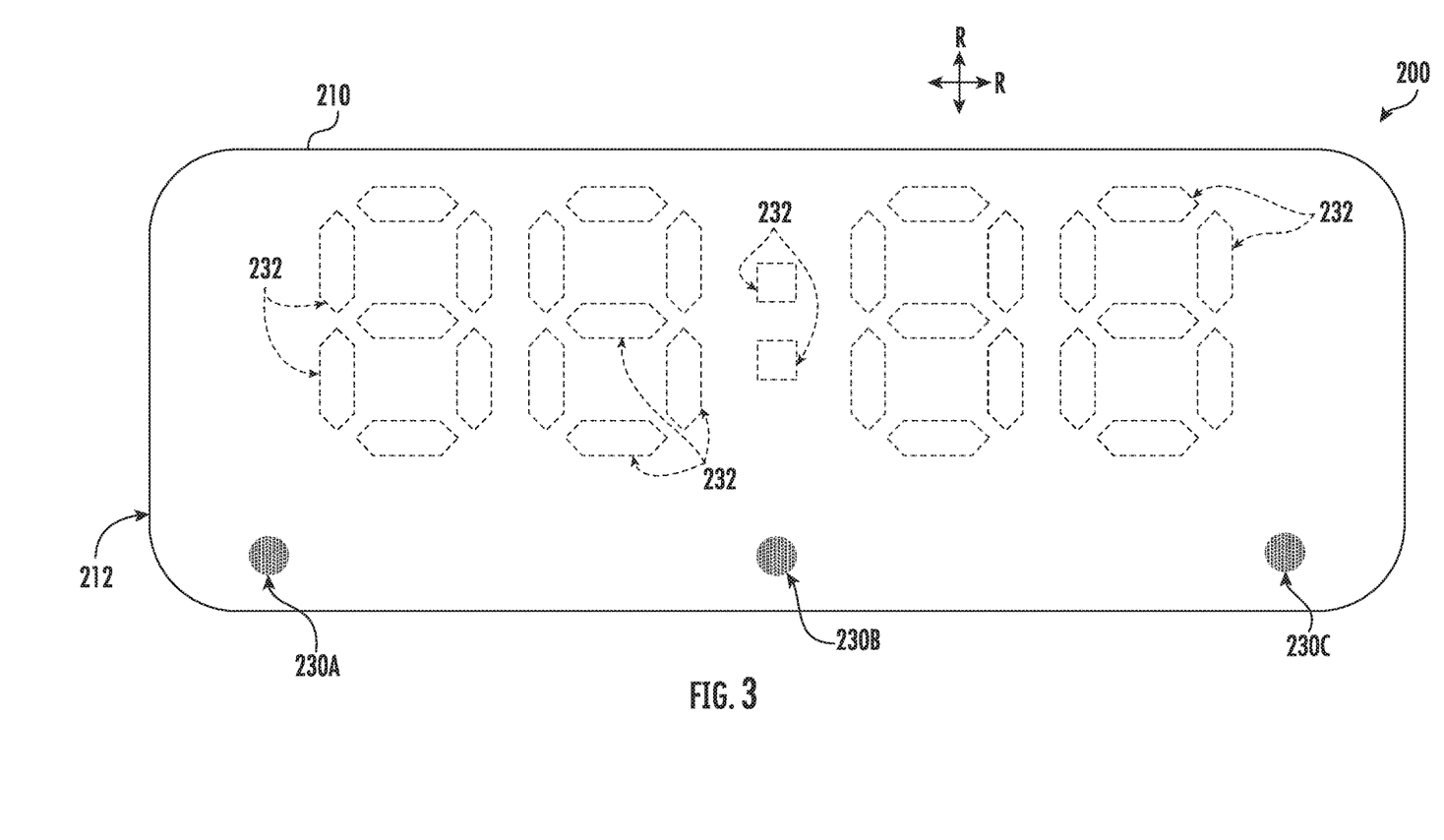
FIG. 3 provides a plan view of a user interface according to exemplary embodiments of the present disclosure.
Figure 4:
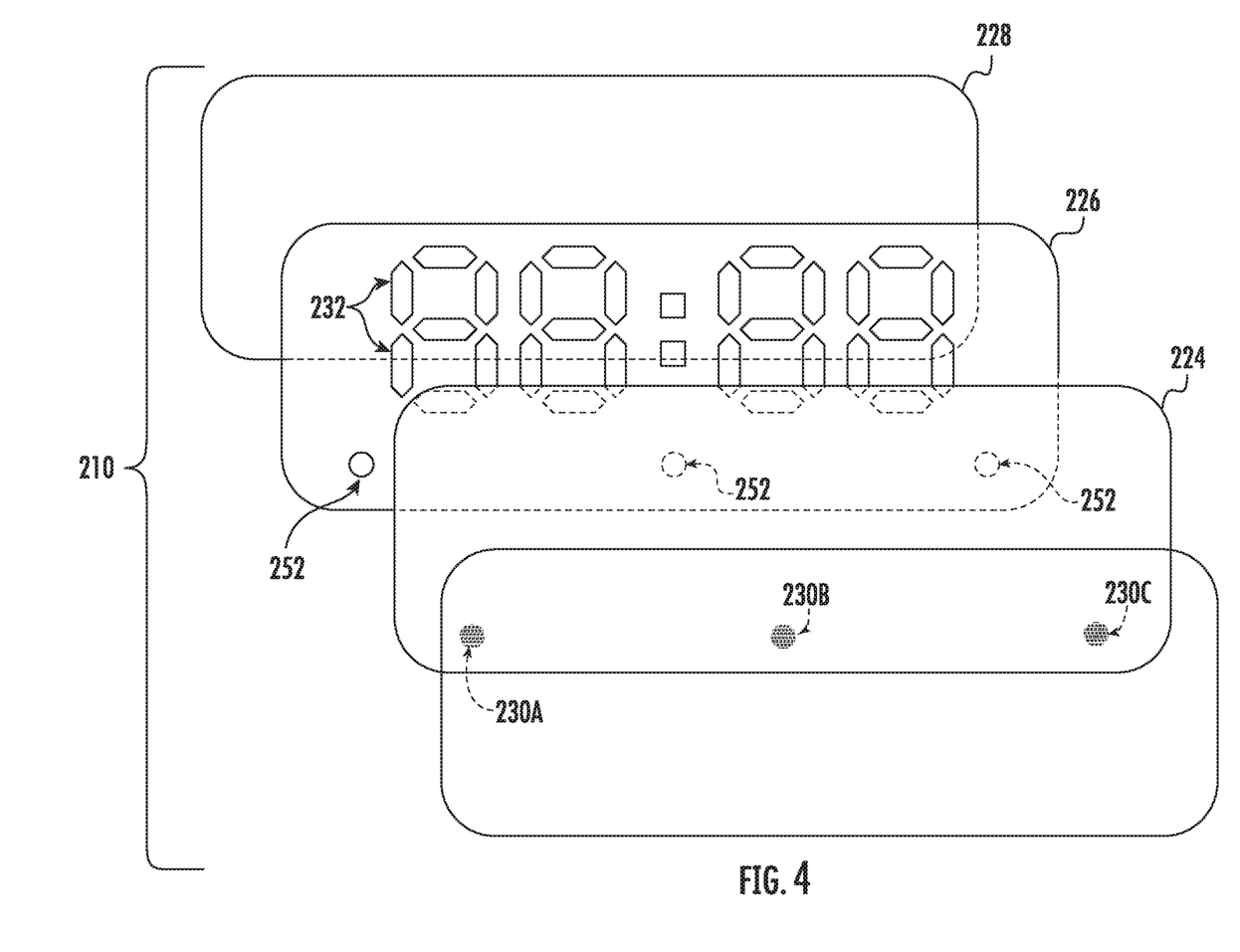
FIG. 4 provides an exploded view of a display panel portion of the exemplary user interface of FIG. 3.

Turning to the figures, FIGS. 1 and 2 illustrate perspective views of an example consumer appliance 100 (e.g., a refrigerator appliance) that includes a control or user interface panel 148. Refrigerator appliance 100 includes a housing or cabinet 102 having an outer liner 118. As shown, cabinet generally extends between a top 104 and a bottom 106 along a vertical direction V, between a first side 108 and a second side 110 along a lateral direction L, and between a front side 112 and a rear side 114 along a transverse direction T. Each of the vertical direction V, lateral direction L, and transverse direction T are mutually perpendicular to one another and form an orthogonal direction system.

It is noted that although consumer appliance 100 is shown as a refrigerator appliance, additional or alternative embodiments may provide a different consumer appliance (e.g., different type of appliance), such as an oven appliance, microwave appliance, dishwasher appliance, washing machine appliance, dryer appliance, or any other suitable consumer appliance.

As shown, cabinet 102 generally defines chilled chambers for receipt of food items for storage. In particular, cabinet 102 defines fresh food chamber 122 proximal to adjacent top 104 of cabinet 102 and a freezer chamber 124 arranged proximal to 106 of cabinet 102. As such, refrigerator appliance 100 is generally referred to as a bottom mount refrigerator.

According to the illustrated embodiment, various storage components are mounted within fresh food chamber 122 to facilitate storage of food items therein as will be understood by those skilled in the art. In particular, the storage components include bins 170, drawers 172, and shelves 174 that are mounted within fresh food chamber 122. Bins 170, drawers 172, and shelves 174 are positioned to receive of food items (e.g., beverages or solid food items) and may assist with organizing such food items. As an example, drawers 172 can receive fresh food items (e.g., vegetables, fruits, or cheeses) and increase the useful life of such fresh food items. In some embodiments, a lateral mullion 116 is positioned within cabinet 102 and separating freezer chamber 124 and the fresh food chamber 122 along a vertical direction V.

Refrigerator doors 128 are rotatably hinged to an edge of cabinet 102 for selectively accessing fresh food chamber 122 and extending across at least a portion of fresh food chamber 122. In addition, a freezer door 130 is arranged below refrigerator doors 128 for selectively accessing freezer chamber 124 and extending across at least a portion of freezer chamber 124. Freezer door 130 is coupled to a freezer drawer (not shown) slidably mounted within freezer chamber 124. Refrigerator doors 128 and freezer door 130 are each shown in the closed position in FIG. 1 (i.e., a first closed position corresponding to doors 128, and a second closed position corresponding to door 130).

Refrigerator appliance 100 also includes a delivery assembly 140 for delivering or dispensing liquid water or ice. Delivery assembly 140 includes a dispenser 142 positioned on or mounted to an exterior portion of refrigerator appliance 100 (e.g., on one of refrigerator doors 128). Dispenser 142 includes a discharging outlet 144 for accessing ice and liquid water. An actuating mechanism 146, shown as a paddle, is mounted below discharging outlet 144 for operating dispenser 142. In alternative exemplary embodiments, any suitable actuating mechanism may be used to operate dispenser 142. For example, dispenser 142 can include a sensor (such as an ultrasonic sensor) or a button rather than the paddle. A control or user interface panel 148 is provided for directing (e.g., selecting) the mode of operation. For example, user interface panel 148 includes a plurality of user inputs (not labeled), such as a capacitive water dispensing button and an ice-dispensing button, for selecting a desired mode of operation such as crushed or non-crushed ice.

In some embodiments, discharging outlet 144 and actuating mechanism 146 are an external part of dispenser 142 and are mounted in a dispenser recess 150. Dispenser recess 150 is positioned at a predetermined elevation convenient for a user to access ice or water and enabling the user to access ice without the need to bend-over and without the need to open refrigerator doors 128. In exemplary embodiments, dispenser recess 150 is positioned at a level that approximates the chest level of a user. During certain operations, the dispensing assembly 140 may receive ice from an icemaker 152 mounted in a sub-compartment of the fresh food chamber 122, as described below.

Operation of the refrigerator appliance 100 can be generally controlled or regulated by a controller 190. In some embodiments, controller 190 is operably coupled to user interface panel 148 and various other components, as will be described below. User interface panel 148 provides selections for user manipulation of the operation of refrigerator appliance 100. As an example, user interface panel 148 may provide for selections between whole or crushed ice, chilled water, or specific modes of operation. In response to one or more input signals (e.g., from user manipulation of user interface panel 148 or one or more signals received from a connected sensor), controller 190 may operate various components of the refrigerator appliance 100 according to the current mode of operation.

Controller 190 may include a memory and one or more microprocessors, CPUs or the like, such as general or special purpose microprocessors operable to execute programming instructions or micro-control code associated with operation of refrigerator appliance 100. The memory may represent random access memory such as DRAM, or read only memory such as ROM or FLASH. In some embodiments, the processor executes programming instructions stored in memory. For certain embodiments, the instructions include a software package configured to operate appliance 100. The memory may be a separate component from the processor or may be included onboard within the processor. Alternatively, controller 190 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

Controller 190, or portions thereof, may be positioned in a variety of locations throughout refrigerator appliance 100. In exemplary embodiments, controller 190 is located on or behind the user interface panel 148 (e.g., within refrigerator door 128). In other embodiments, the controller 190 may be positioned at any suitable location within refrigerator appliance 100, such as within the fresh food chamber 122, a freezer door 130, etc. Input/output ("I/O") signals may be routed between controller 190 and various operational components of refrigerator appliance 100. For example, user interface panel 148 may be operably coupled to controller 190 via one or more signal lines or shared communication busses.

FIG. 2 provides a perspective view of refrigerator appliance 100 shown with refrigerator doors 128 in the open position. As shown, an icebox liner 132 defining a sub-compartment (e.g., icebox compartment 160) is attached to cabinet 102. For instance, in some embodiments, at least one door 128 includes icebox liner 132 positioned thereon. In turn, icebox compartment 160 is defined within one of doors 128. In some such embodiments, icebox compartment 160 extends into fresh food chamber 122 when refrigerator door 128 is in the closed position. Although icebox compartment 160 is shown in door 128, additional or alternative embodiments may include an icebox compartment defined at another portion of refrigerator appliance 100 (e.g., within freezer door 130 or fresh food chamber 122). An ice making assembly or icemaker 152 may be positioned or mounted within icebox compartment 160. Ice may be supplied to dispenser recess 150 (FIG. 1) from the icemaker 152 in icebox compartment 160 on a back side of refrigerator door 128.

An access door—e.g., icebox door 162—may be hinged to icebox compartment 160 to selectively cover or permit access to opening of icebox compartment 160. When refrigerator door 128 and icebox door 162 are both closed, icebox door 162 thus seals icebox compartment 160 from fresh food chamber 122. Any manner of suitable latch 164 is provided with icebox compartment 160 to maintain icebox door 162 in a closed position. As an example, latch 164 may be actuated by a consumer in order to open icebox door 162 for providing access into icebox compartment 160. Icebox door 162 can also assist with insulating icebox compartment 160 (e.g., by thermally isolating or insulating icebox compartment 160 from fresh food chamber 122). Icebox compartment 160 may receive cooling air from a chilled air supply duct 166 and a chilled air return duct 168 positioned on a side portion of cabinet 102 of refrigerator appliance 100 (e.g., at least partially enclosed between outer liner 118 and internal liner 120). In this manner, the supply duct 166 and return duct 168 may recirculate chilled air from a suitable heat exchange case 202 through icebox compartment 160. An air handler, such as a fan or blower, may be provided to motivate and recirculate air.

In some embodiments, one or more of an icemaker 152 and ice bucket or storage bin 154 are provided within icebox compartment 160. Icemaker 152 may be any suitable assembly for generating ice from liquid water, such as a rigid cube, soft-ice, or nugget ice making assembly. Ice storage bin 154 may be positioned to receive or store ice from icemaker 152. Optionally, ice storage bin 154 is positioned below icemaker 152 and receives therefrom. For instance, an ice chute (not pictured) may be positioned adjacent to icemaker 152 to direct ice from icemaker 152 to ice bin 154. From ice storage bin 154, the ice can enter delivery assembly 140 and be accessed by a user.

Turning now to FIGS. 3 through 6, an exemplary user interface 200 is illustrated for use within a consumer appliance, such as appliance 100 (FIGS. 1 and 2). It is understood that user interface 200 may include or be embodied as user interface panel 148 (FIG. 1), or as an alternative thereto.

Generally, user interface 200 defines an axial direction A and a radial direction R perpendicular thereto. In certain embodiments, axial direction A understood to be parallel to the transverse direction T (FIG. 1)—e.g., when door 128 is in the closed position. The radial direction R may thus be parallel to the vertical direction V and the lateral direction L.

As shown, user interface 200 includes a display plate assembly 210 that has multiple attached layers extending in the radial direction R to a perimeter edge 212 that defines the radial extreme/extrema of display plate assembly 210. When assembled, display plate assembly 210 defines an outer surface 214 and an inner surface 216 that are spaced apart along the axial direction A. The outer surface 214 is generally directed towards (i.e., faces) the surrounding ambient environment (e.g., in front of the door 128—FIG. 1). A user may thus view or engage (e.g., touch) the outer surface 214 during use. The inner surface 216 is opposite the outer surface 214 and is generally directed away from the surrounding environment (e.g., towards an internal cavity 218, which may be provided as an insulated internal portion of door 128—FIG. 1). When assembled, the outer surface 214 may be hidden from view or user contact. As will be described in greater detail below, one or more sensors 220A, 220B may be mounted or otherwise positioned behind plate assembly 210 (e.g., along the axial direction A) such that the sensors 220A, 220B are hidden or blocked from view.

In some embodiments, display plate assembly 210 includes a substrate panel 222 that generally extends along the radial direction R in front of sensor(s) 220A, 220B. Substrate panel 222 may be provided as a generally rigid member extending to the perimeter edge 212. In optional embodiments, substrate panel 222 is formed from or integrally with a portion of a panel that extends beyond the perimeter edge 212. For instance, substrate panel 222 may be an integral or unitary portion of a larger panel that extends across the entire front-facing surface of door 128—FIG. 1. The perimeter edge 212 may thus be defined behind substrate panel 222 and visually-indistinguishable to a user. Additionally or alternatively, substrate panel 222 may be formed as non-permeable solid member (e.g., such that water is not permitted to pass through a solid body portion of the substrate panel 222). Moreover, substrate panel 222 may be free of any predefined orifice that might permit the passage of water therethrough (e.g., along the axial direction A). In some embodiments, substrate panel 222 defines an axial extreme of display plate assembly 210 and forms the entirety, or some portion, of outer surface 214.

In some embodiments, substrate panel 222 is formed from one or more suitable material, such as a rigid polymer material (e.g., acrylic, polycarbonate, etc.) or ceramic material (e.g., glass or glass-ceramic). Optionally, all or some of substrate panel 222 may be optically transparent (e.g., along the axial direction A).

An applied layer 224 is also included with display plate assembly 210. For instance, applied layer 224 may be attached to substrate panel 222 (e.g., behind substrate panel 222 along the axial direction A). In certain embodiments, applied layer 224 directly contacts an inner portion of substrate panel 222. When assembled, the applied layer 224 may be between the sensor(s) 220A or 220B and substrate panel 222 along the axial direction A.

Generally, applied layer 224 extends along the radial direction R and forms a visually-continuous surface extending to the perimeter edge 212. In some embodiments, a printed ink embodies, or is included as part of, applied layer 224. As an example, ink may be printed or deposited directly onto the inner portion of substrate panel 222. As another example, ink may be printed or deposited onto an intermediate film, such as a flexible or elastic polymer that is attached to substrate panel 222. Optionally, an adhesive on the intermediate film may hold the intermediate film to the substrate panel 222. In other embodiments, applied layer 224 includes any suitable material or finish attached to substrate panel 222, such as, for example, an applied paint, vinyl or plastic cutout, resin, etc.

When assembled, applied layer 224 may be generally opaque when viewed from the front by a user. Thus, applied layer 224 includes at least one material (e.g., opaque material—such as ink) that restricts light along at least a portion of the visible light spectrum (e.g., between 390 nanometers and 700 nanometers). Furthermore, the opaque material may restrict light along non-visible portions of the light spectrum (e.g., infrared light). Nonetheless, as will be described in greater detail below, one or more perforated regions 230A, 230B, 230C are defined on or through applied layer 224. Moreover, a separate lighting assembly (not pictured) having one or more light sources, such as a light emitting diode (LED), may be provided behind display plate assembly 210. When active, the lighting assembly may be configured to selectively activate and emit light towards the display. In such embodiments, display plate assembly 210 is understood to provide a dead-fronted visual indicator or display, behind which the lighting assembly and the portion to be illuminated is hidden or obscured when lighting assembly is inactive (i.e., no light emissions are being projected from lighting assembly).

In some such embodiments, display plate assembly 210 further includes a refining or secondary layer 226 that is positioned behind applied layer 224. For instance, secondary layer 226 may be formed as an opaque film or coating extending across at least a portion of applied layer 224 (e.g., in direct contact therewith). Secondary layer 226 may generally extend in the radial direction R to or within the bounds of perimeter edge 212. However, one or more light apertures 232 may be defined through secondary layer 226 in the axial direction A (e.g., in axial alignment with the lighting assembly). The light apertures 232 may be formed according to any suitable shape, such as a numerical symbol, pictorial icon, or text to limit or refine the light emissions that may be visible to a user through display plate assembly 210 (e.g., while lighting assembly is active).

In optional embodiments, another suitable layer (e.g., tertiary layer 228) may be provided with display plate assembly 210 (e.g., between sensor(s) 220A or 220B and applied layer 224 along the axial direction A). As an example, an infrared (IR) transparent ink may be included with or deposited as tertiary layer 228. As would be understood by one of ordinary skill in the art, IR transparent ink is understood to provide limited absorption and high-permeability for light within a defined wavelength spectrum (e.g., between 700 nanometers and 1 millimeter), while being visually opaque to restrict light of one or more colors within the visible light spectrum. When assembled, tertiary layer 228, including IR transparent ink, may extend continuously in the radial direction R to the perimeter edge 212. In some such embodiments, tertiary layer 228 defines an axial extreme of display plate assembly 210 and forms the entirety, or some portion, of inner surface 216. In alternative embodiments, inner surface 216 may be formed from another layer, such as secondary layer 226 or applied layer 224.

Figure 5:
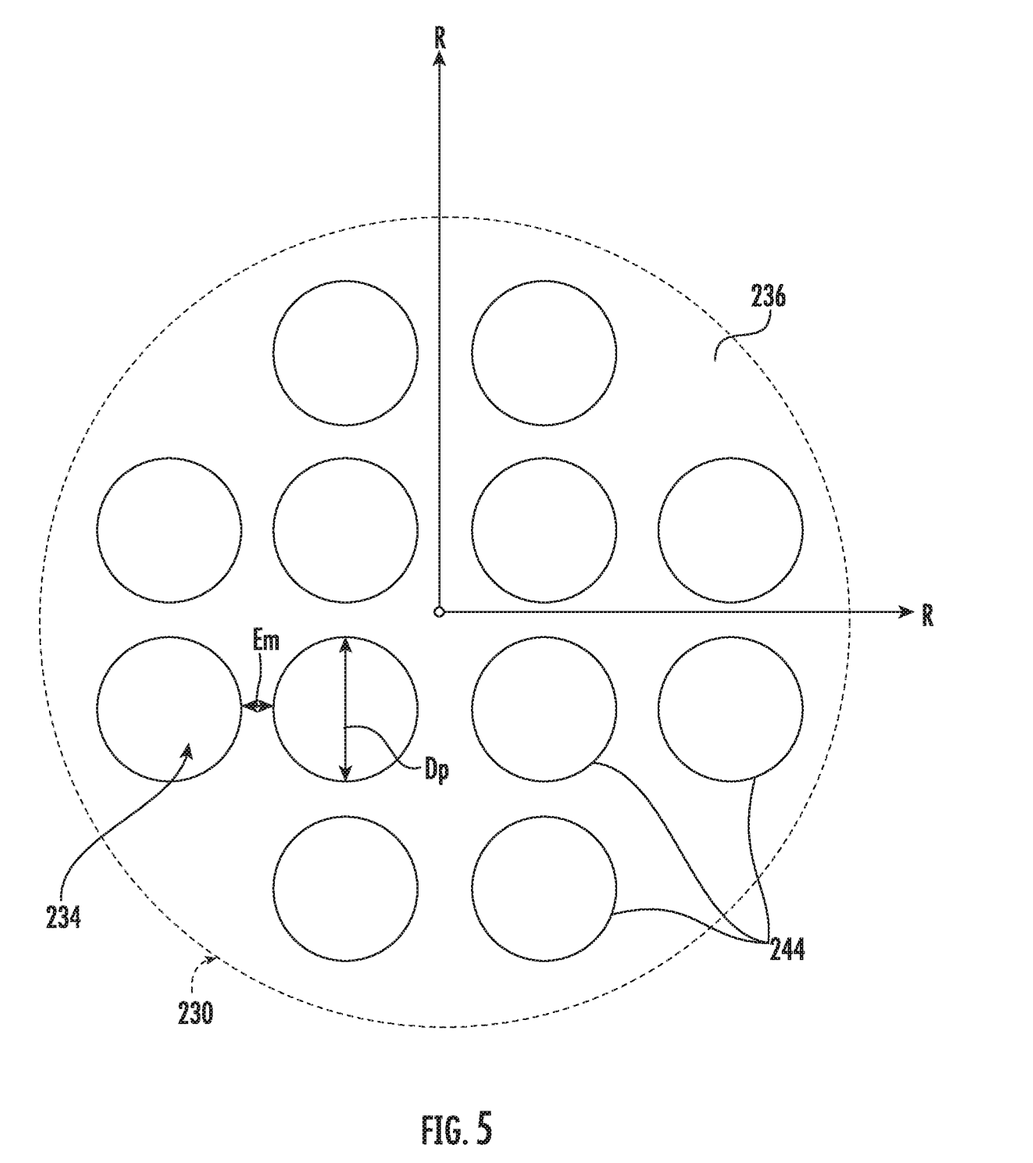
FIG. 5 provides a magnified view of a portion of the exemplary user interface of FIG. 3.

Turning especially to FIG. 5, as noted above, applied layer 224 includes one or more perforated regions 230 (e.g., representative of region 230A, 230B, or 230C). Generally, a perforated region 230 includes a separate deposited portion 234 and negative portion 236. Specifically, the deposited portion 234 may be formed from the opaque material (e.g., printed ink) of applied layer 224. The negative portion 236 defines a void that may be free of any opaque material and visually transparent therethrough (e.g., along the axial direction A). Visible as well as infrared light may thus travel through the negative portion 236 (e.g., along the axial direction A). By contrast, surrounding the perforated region 230 (e.g., the portion of applied layer 224 that does not define a perforated region 230A, 230B, 230C—FIG. 3), the opaque material of applied layer 224 forms a continuous region 248 through which visible and infrared light is restricted, as described above.

In some embodiments, deposited portion 234 comprises a plurality of discrete members 244 (e.g., non-contiguous dots spaced apart along the radial direction R) within the perforated region 230. Negative portion 236 may be formed from one or more contiguous void segments about the discrete members 244 (e.g., in the radial direction R). For instance, one or more of the discrete members 244 of the deposited portion 234 may be surrounded by the contiguous transparent void of negative portion 236. In certain embodiments, each discrete member 244 has a preset diameter $D_p$ (e.g., along the radial direction R). For instance, the preset diameter $D_p$ of each discrete member 244 may be substantially identical. In some embodiments, the preset diameter $D_p$ is between about 0.1 millimeters and about 0.6 millimeters. In further embodiments, the preset diameter $D_p$ is about 0.2 millimeters.

Generally, the discrete members 244 may be arranged in any suitable pattern. The pattern may be predetermined or randomized. In optional embodiments, the discrete members 244 are organized as a predefined grid, as illustrated in FIG. 5. As an example, discrete members 244 may be linearly aligned into parallel rows and columns (e.g., along two mutually-perpendicular axes). As another example, discrete members 244 may be at least partially offset. For instance, multiple rows may be organized in parallel while alternating columns are positioned at a non-parallel angle relative to each other. Other examples would be readily apparent to one of ordinary skill in light of the present disclosure. Moreover, although discrete members 244 are illustrated as having a circular profile (e.g., in a plane parallel to the radial direction R), any other suitable profile shape may be provided. In such embodiments, the above-described preset diameter $D_p$ may define a minimum distance of the discrete member's profile along the radial direction R.

In some embodiments, the negative portion 236 defines a preset minimum length $E_m$ (e.g., along the radial direction R) across the transparent void. Thus, a minimum radial space between adjacent discrete members 244. For example, the contiguous transparent void may define the minimum length $E_m$ between one or more adjacent discrete members 244. A unique maximum width that is longer the minimum length $E_m$ may also be defined as a length between other adjacent discrete members 244. The minimum length $E_m$ may be equal to or, alternatively, different from the preset diameters $D_p$. In some embodiments, the minimum length $E_m$ is between about 0.1 millimeters and about 0.6 millimeters. In further embodiments, the minimum length $E_m$ is about 0.2 millimeters.

In additional or alternative embodiments, one or both of the preset diameters $D_p$ or minimum lengths $E_m$ may vary as a gradient in a specific direction or directions (e.g., in the radial direction R or along a linear band). As an example, the preset diameters $D_p$ of discrete members 244 may progressively increase along the radial direction R. As another example, the minimum lengths $E_m$ between adjacent discrete members 244 may progressively decrease along the radial direction R. In turn, the discrete members 244 may generally increase in density as, for example, a radial path is followed outward from a point of relatively low density, visually and physically blending with the rest of the ink of the applied layer 224.

It is noted that, although the exemplary embodiment of FIG. 5 is illustrated as having a deposited portion 234 of discrete members 244, alternative embodiments may reverse that configuration such that negative portion 236 defines the plurality of discrete members 244 (e.g., non-contiguous dots spaced apart along the radial direction R) within the perforated region 230. Additionally or alternatively, deposited portion 234 may be contiguous about the discrete members 244 (e.g., in the radial direction R). One or more of the discrete members 244 of the negative portion 236 may be surrounded by the contiguous opaque material of the deposited portion 234.

It is further noted that the described perforated regions of the present disclosure may advantageously be difficult or impossible to visually distinguish for a user. Moreover, the described user interface 200 may notably facilitate the passage of, for example, infrared light emissions therethrough (e.g., at the predetermined location of the perforated regions.

Returning generally to FIGS. 3 through 6, one or more layer behind applied layer 224 may define a transparent aperture 252. In particular, secondary layer 226 may define transparent aperture 252 as an open void. Alternatively a solid transparent material (e.g., polymer) may be positioned within transparent aperture 252. When assembled, each transparent aperture 252 is axially aligned within a corresponding perforated region 230A, 230B, or 230C. Optionally, transparent aperture 252 may define radial diameter that is greater than or equal to a radial diameter of the corresponding perforated region 230A, 230B, or 230C. As shown, in exemplary embodiments, the tertiary layer 228 radially spans and covers transparent aperture 252. Thus, while visible light through display plate assembly 210 may be generally restricted, infrared light may be permitted along the axial path defined by transparent aperture 252 and perforated region 230A, 230B, or 230C.

In certain embodiments, multiple perforated regions 230A, 230B, 230C (e.g., along with corresponding transparent apertures 252) are provided with display plate assembly 210. For instance, a discrete first perforated region 230A and second perforated region 230B. Additional perforated regions 230C may be further provided. As shown, the discrete perforated regions 230A, 230B, 230C are generally spaced apart from each other along the radial direction R. However, the regions 230A, 230B, 230C may be parallel along the axial direction A.

In certain embodiments, one or more of the sensors 220A, 220B are provided as electromagnetic sensors, such as a light or infrared (IR) sensor, and are axially aligned with a corresponding perforated region (e.g., perforated region 230A, 230B, or 230C). As an example, at least one electromagnetic sensor may be an IR emitter sensor 220A configured to project a generated infrared light emission (e.g., as directed by controller 190) through the corresponding perforated region (e.g., first perforated region 230A). At least one other electromagnetic sensor may be an IR detector sensor 220B configured to receive a reflected infrared light emission through the corresponding perforated region (e.g., second perforated region 230B). Reception of the reflected infrared light emission (e.g., including strength thereof) may be communicated to controller 190, for instance, by transmission of a corresponding reception signal to controller 190 from IR detector sensor 220B.

Together, IR emitter sensor 220A and IR detector sensor 220B may be used to transmit and detect reflected infrared light transmissions. For instance, a user standing within a predetermined distance from the user interface 200 may cause IR emissions from IR emitter sensor 220A to be reflected toward, and received by, IR detector sensor 220B. In some embodiments, controller 190 may be configured to initiate an operation in response to detection of the reflected infrared light emissions. For instance, detection may cause the lighting assembly of user interface 200 to activate or brighten to indicate the presence of user.

Figure 7:
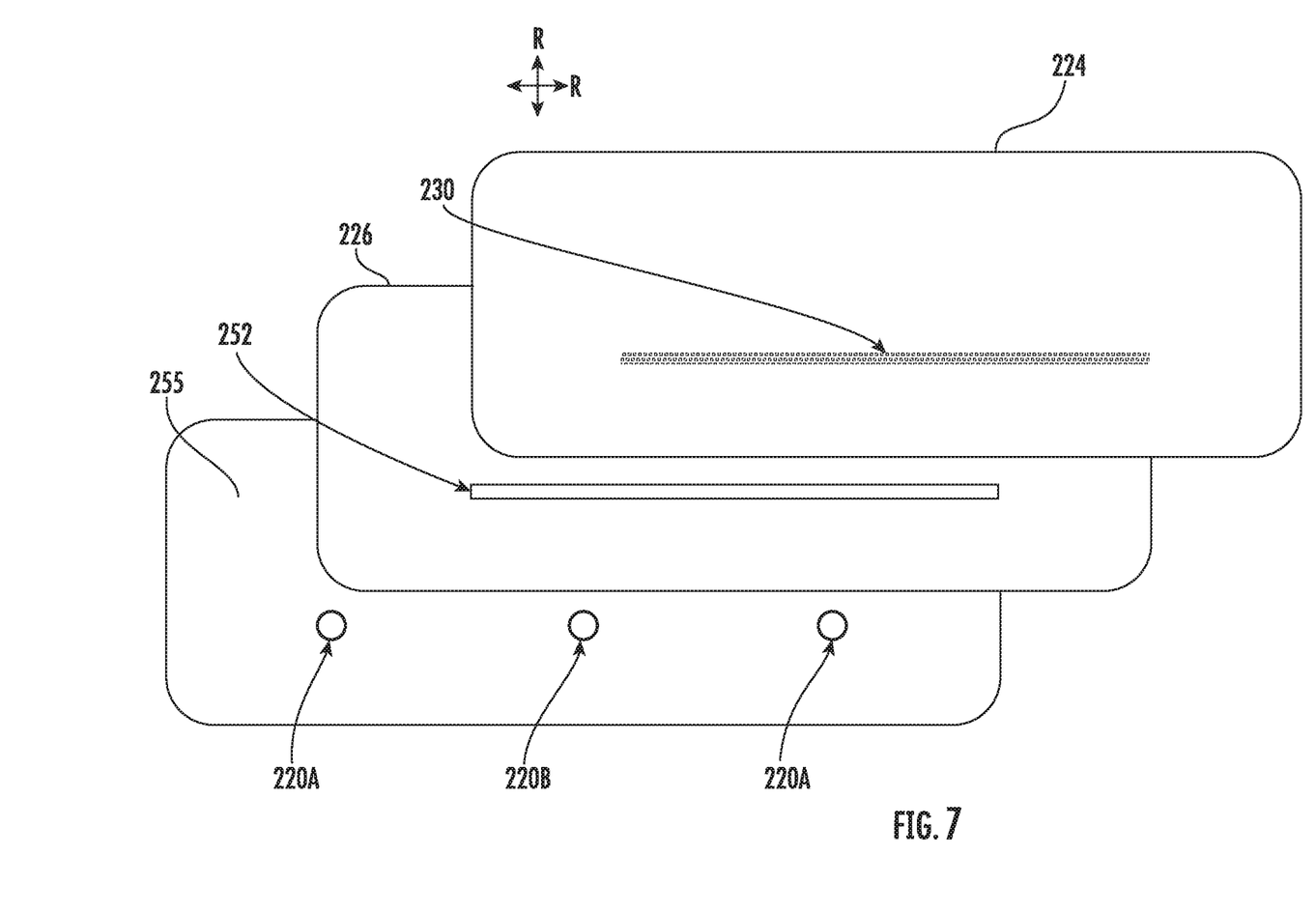
FIG. 7 provides an exploded view of a display panel portion of according to other exemplary embodiments of the present disclosure.

Turning briefly to FIG. 7, it is noted that certain embodiments include a single perforated region 230 that extends (e.g., as a continuous linear or horizontal band) in front of or across multiple sensors 220A, 220B. Thus, as illustrated, each sensor 220A, 220B may be axially aligned with the same perforated region 230, but at different points therealong. In particular, each sensor 220A, 220B may be radially spaced apart from the other (e.g., on a common printed circuit board 255). During use of some such embodiments, IR emissions from/to the sensors 220A, 220B may thus pass through different portions of the same perforated region 230. In some such embodiments, a single transparent aperture 252 is axially aligned with the single perforated region 230 between the sensors 220A, 220B and the applied layer 224. Moreover, the transparent aperture 252 may define an outline or diameter that is greater than or equal to the outline or diameter of the corresponding perforated region 230.

Figure 6:
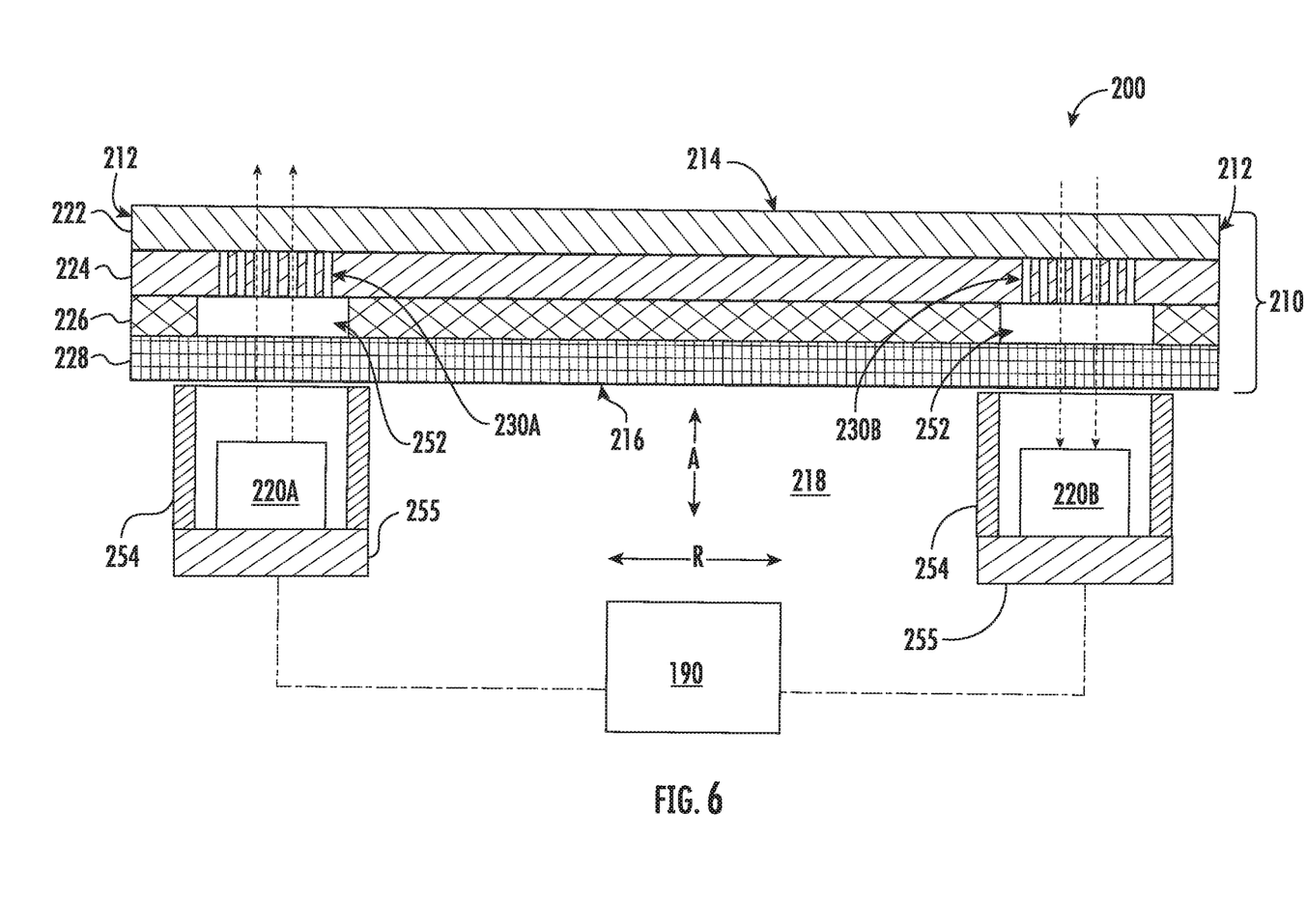
FIG. 6 provides a cross-sectional schematic view of a user interface according to exemplary embodiments of the present disclosure.

As shown in FIG. 6, in optional embodiments, a unique opaque barrier collar 254 (e.g., resilient gasket) is positioned around (e.g., to surround) one or more of the sensors 220A, 220B. Barrier collars 254 may extend axially from sensors 220A, 220B toward display plate assembly 210 (e.g., in contact with inner surface 216). For instance, barrier collars 254 may rest on the same printed circuit board 255 on which the sensors 220A, 220A are mounted. During use, barrier collars 254 may force or direct light along the axial direction A and prevent radial leakage. Stray light emissions passing behind display plate assembly 210 may thus be prevented or restricted.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An appliance user interface defining an axial direction, the appliance user interface comprising:

a substrate panel;
an electromagnetic sensor positioned behind the substrate panel along the axial direction; and
an applied layer attached to the substrate panel, the applied layer comprising a perforated region axially aligned with the electromagnetic sensor, the perforated region having a deposited portion and a negative portion, the deposited portion comprising a material restricting infrared light along the axial direction, the negative portion defining a transparent void through the material and permitting infrared light along the axial direction,
wherein the deposited portion comprises a plurality of discrete members within the perforated region, and
wherein the plurality of discrete members are organized as a predefined grid within the perforated region.

2. The appliance user interface of claim 1, wherein each member of the plurality of discrete members has a preset diameter.

3. The appliance user interface of claim 2, wherein the preset diameter is between about 0.1 millimeters and about 0.6 millimeters.

4. The appliance user interface of claim 1, wherein the negative portion defines a preset minimum length across the transparent void.

5. The appliance user interface of claim 4, wherein the preset minimum length is between about 0.1 mm and about 0.6 mm.

6. The appliance user interface of claim 1, wherein the perforated region is a first perforated region, and wherein the applied layer further comprises a second perforated region spaced apart from the first perforated region along a radial direction.

7. The appliance user interface of claim 6, wherein the electromagnetic sensor is an infrared emitter sensor, and wherein the appliance user interface further comprises an infrared detector sensor axially aligned with the second perforated region.

8. The appliance user interface of claim 1, wherein the applied layer is positioned between the electromagnetic sensor and the substrate panel along the axial direction.

9. The appliance user interface of claim 1, further comprising an infrared ink layer attached to the applied layer between the electromagnetic sensor and the applied layer along the axial direction.

10. The appliance user interface of claim 1, further comprising an opaque secondary layer attached to the applied layer between the electromagnetic sensor and the applied layer along the axial direction, wherein the opaque secondary layer defines a transparent aperture axially aligned with the perforated region.

11. An appliance user interface defining an axial direction, the appliance user interface comprising:
a substrate panel;
an electromagnetic sensor positioned behind the substrate panel along the axial direction;
an applied layer attached to the substrate panel between the electromagnetic sensor and the substrate panel along the axial direction, the applied layer comprising a perforated region axially aligned with the electromagnetic sensor, the perforated region having a deposited portion and a negative portion, the deposited portion comprising a material restricting infrared light along the axial direction, the negative portion defining a transparent void through the material and permitting infrared light along the axial direction; and
an opaque secondary layer attached to the applied layer between the electromagnetic sensor and the applied layer along the axial direction, wherein the opaque secondary layer defines a transparent aperture axially aligned with the perforated region.

12. The appliance user interface of claim 11, wherein the deposited portion comprises a plurality of discrete members within the perforated region, and wherein each member of the plurality of discrete members has a preset diameter.

13. The appliance user interface of claim 12, wherein the preset diameter is between about 0.1 millimeters and about 0.6 millimeters.

14. The appliance user interface of claim 12, wherein the plurality of discrete members are organized as a predefined grid within the perforated region.

15. The appliance user interface of claim 11, wherein the negative portion defines a preset minimum length across the transparent void.

16. The appliance user interface of claim 11, wherein the preset minimum length is between about 0.1 mm and about 0.6 mm.

17. The appliance user interface of claim 11, wherein the perforated region is a first perforated region, wherein the applied layer further comprises a second perforated region spaced apart from the first perforated region along a radial direction, wherein the electromagnetic sensor is an infrared emitter sensor, and wherein the appliance user interface further comprises an infrared detector sensor axially aligned with the second perforated region.

18. The appliance user interface of claim 11, further comprising an infrared ink layer attached to the applied layer between the electromagnetic sensor and the applied layer along the axial direction.

19. An appliance user interface defining an axial direction, the appliance user interface comprising:
a substrate panel;
an electromagnetic sensor positioned behind the substrate panel along the axial direction; and
an applied layer attached to the substrate panel, the applied layer comprising a perforated region axially aligned with the electromagnetic sensor, the perforated region having a deposited portion and a negative portion, the deposited portion comprising a material restricting infrared light along the axial direction, the negative portion defining a transparent void through the material and permitting infrared light along the axial direction,
wherein the applied layer is positioned between the electromagnetic sensor and the substrate panel along the axial direction.

20. The appliance user interface of claim 19, further comprising an infrared ink layer attached to the applied layer between the electromagnetic sensor and the applied layer along the axial direction, wherein the negative portion defines a preset minimum length across the transparent void, and wherein the preset minimum length is between about 0.1 mm and about 0.6 mm.

* * * * *